United States Patent
Puttur et al.

(10) Patent No.: US 11,294,761 B1
(45) Date of Patent: *Apr. 5, 2022

(54) APPARATUS, SYSTEM, AND METHOD FOR CORRECTING SLOW FIELD-REPLACEABLE UNITS IN NETWORK DEVICES

(71) Applicant: Juniper Networks, inc., Sunnyvale, CA (US)

(72) Inventors: Rafik Puttur, Dakshina Kannada (IN); Manoj Nayak, Bangalore (IN); Beena Krishne Gowda, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,271

(22) Filed: Oct. 1, 2020

Related U.S. Application Data

(63) Continuation of application No. 16/145,107, filed on Sep. 27, 2018, now Pat. No. 10,831,592.

(51) Int. Cl.
| | | |
|---|---|---|
| *G06F 11/00* | (2006.01) | |
| *G06F 11/07* | (2006.01) | |
| *G06F 11/14* | (2006.01) | |
| *H04L 41/0654* | (2022.01) | |
| *H04L 41/0816* | (2022.01) | |
| *G06F 11/34* | (2006.01) | |

(52) U.S. Cl.
CPC ........ *G06F 11/0793* (2013.01); *G06F 11/079* (2013.01); *G06F 11/142* (2013.01); *G06F 11/1438* (2013.01); *G06F 11/3419* (2013.01); *H04L 41/0672* (2013.01); *H04L 41/0816* (2013.01)

(58) Field of Classification Search
CPC ............ G06F 11/0793; G06F 11/3419; G06F 11/142; G06F 11/079; G06F 11/1438; H04L 41/0672; H04L 41/0816
USPC ...................................................... 714/1–57
See application file for complete search history.

(56) References Cited

U.S. PATENT DOCUMENTS

| | | | |
|---|---|---|---|
| 5,313,628 A | * | 5/1994 | Mendelsohn ....... G06F 11/2025 714/3 |
| 6,718,472 B1 | | 4/2004 | Garnett |

(Continued)

OTHER PUBLICATIONS

Non-Final Office Action received for U.S. Appl. No. 16/145,107 dated Jun. 1, 2020, 23 pages.

(Continued)

*Primary Examiner* — Sarai E Butler
(74) *Attorney, Agent, or Firm* — FisherBroyles, LLP

(57) ABSTRACT

A disclosed method may include (1) identifying a set of field-replaceable units installed on a network device, (2) monitoring the set of FRUs for flapping that renders any of the FRUs temporarily inoperable, (3) detecting at least one flap in which an FRU within the set (A) experiences a fault that renders the FRU temporarily inoperable and (B) subsequently overcomes the fault to resume operability, (4) determining that the FRU is deficient based at least in part on at least one characteristic of the flap detected in connection with the FRU, and (5) performing at least one corrective action that addresses the deficiency of the FRU. Various other systems and methods are also disclosed.

20 Claims, 7 Drawing Sheets

(56) References Cited

U.S. PATENT DOCUMENTS

| | | | |
|---|---|---|---|
| 2002/0095615 A1* | 7/2002 | Hastings | G11B 27/36 |
| | | | 714/4.1 |
| 2008/0024949 A1* | 1/2008 | Kulkarni | G06F 11/1415 |
| | | | 361/111 |
| 2008/0126864 A1* | 5/2008 | Abdul | G06F 11/2242 |
| | | | 714/31 |
| 2009/0210747 A1* | 8/2009 | Boone | G06F 11/079 |
| | | | 714/31 |
| 2011/0144939 A1 | 6/2011 | Cashman et al. | |
| 2011/0154097 A1* | 6/2011 | Barlow | G06F 11/0748 |
| | | | 714/3 |
| 2011/0154115 A1 | 6/2011 | Calkin et al. | |
| 2012/0023367 A1* | 1/2012 | Rudy | G06F 11/3055 |
| | | | 714/16 |
| 2012/0239983 A1 | 9/2012 | Cashman et al. | |
| 2013/0046727 A1* | 2/2013 | Jones | G01N 33/0004 |
| | | | 706/52 |
| 2015/0363288 A1* | 12/2015 | Frick | G06F 1/28 |
| | | | 714/6.3 |
| 2017/0091007 A1* | 3/2017 | Dasari | G06F 11/0772 |
| 2018/0364669 A1* | 12/2018 | Bostick | G05B 19/0426 |

OTHER PUBLICATIONS

Notice of Allowance received for U.S. Appl. No. 16/145,107 dated Jul. 29, 2020, 23 pages.

\* cited by examiner

APPARATUS, SYSTEM, AND METHOD FOR CORRECTING SLOW FIELD-REPLACEABLE UNITS IN NETWORK DEVICES

CROSS REFERENCE TO RELATED APPLICATION

This application is a continuation of U.S. application Ser. No. 16/145,107 filed 27 Sep. 2018, the disclosure of which is incorporated, in its entirety, by this reference.

BACKGROUND

Network devices (such as routers and switches) are often used to forward traffic within a network and/or across networks. These network devices may include and/or house various Field-Replaceable Units (FRUs) that facilitate the ability to forward such traffic. Unfortunately, these FRUs may experience certain periods of deficiency and/or inoperability caused by hardware, firmware, and/or software malfunctions. Each bout of temporary deficiency and/or inoperability is sometimes referred to as a "flap", and the process of experiencing repeated flaps is sometimes referred to as "flapping".

Flapping may slow down certain FRUs and/or impair their performance and/or ability to forward traffic. As a result, networks that include network devices with flapping FRUs may experience traffic disturbances and/or delays as well as total outages. The instant disclosure, therefore, identifies and addresses a need for additional and improved apparatuses, systems, and methods for correcting slow FRUs in network devices.

SUMMARY

As will be described in greater detail below, the instant disclosure generally relates to apparatuses, systems, and methods for correcting slow FRUs in network devices. In one example a method for accomplishing such a task may include (1) identifying a set of field-replaceable units installed on a network device, (2) monitoring the set of FRUs for flapping that renders any of the FRUs temporarily inoperable, (3) detecting at least one flap in which an FRU within the set (A) experiences a fault that renders the FRU temporarily inoperable and (B) subsequently overcomes the fault to resume operability, (4) determining that the FRU is deficient based at least in part on at least one characteristic of the flap detected in connection with the FRU, and (5) performing at least one corrective action that addresses the deficiency of the FRU.

Similarly, a system that implements the above-identified method may include a physical processor configured to execute various modules stored in memory. In one example, this system may include and/or execute (1) a monitoring module that (A) identifies a set of FRUs installed on a network device, (B) monitors the set of FRUs for flapping that renders any of the FRUs temporarily inoperable, and (C) detects at least one flap in which a FRU within the set (I) experiences a fault that renders the FRU temporarily inoperable and (II) subsequently overcomes the fault to resume operability, (2) a determination module determines that the FRU is deficient based at least in part on at least one characteristic of the flap detected in connection with the FRU, (3) a correction module that performs at least one corrective action that addresses the deficiency of the FRU.

Additionally or alternatively, an apparatus that implements the above-identified method may include a physical processing device that is communicatively coupled to a physical storage device. In one example, this physical storage device may maintain a database of characteristics of a set of FRUs installed on a network device, and this physical processing device may (1) monitor the set of FRUs for flapping that renders any of the FRUs temporarily inoperable, (2) detect at least one flap in which an FRU within the set (A) experiences a fault that renders the FRU temporarily inoperable and (B) subsequently overcomes the fault to resume operability, (3) determine that the FRU is deficient by comparing the characteristic of the flap against the database of characteristics of the set of FRUs, and then (4) perform at least one corrective action that addresses the deficiency of the field-replaceable unit.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
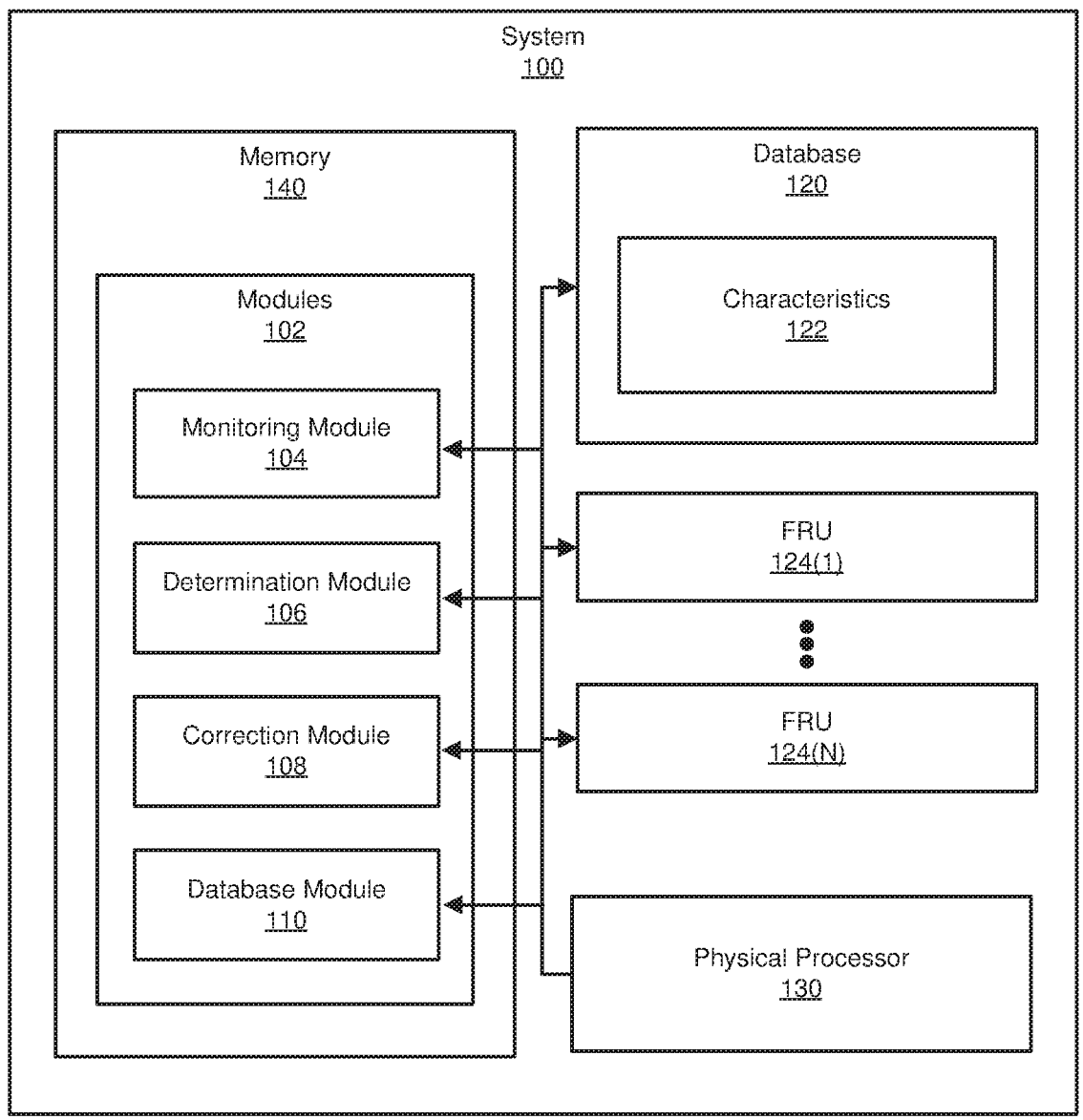
FIG. 1 is a block diagram of an exemplary system for correcting slow FRUs in network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for correcting slow FRUs in network devices. As will be explained in greater detail below, embodiments of the instant disclosure may facilitate addressing and/or fixing any FRUs that are impaired and/or deficient beyond a certain degree. For example, embodiments of the instant disclosure may involve monitor various FRUs installed and/or operating in a network device. These embodiments may also involve detecting a number of flaps in connection with a specific FRU and then determining that the FRU is impaired and/or deficient based at least in part on certain characteristics of the flaps detected in connection with the specific FRU. Finally, these embodiments may involve correcting the impairment and/or deficiency of the FRU, thereby improving the performance, traffic-forwarding capabilities, consistency, and/or availability of the FRU and/or the network device.

Figure 2:
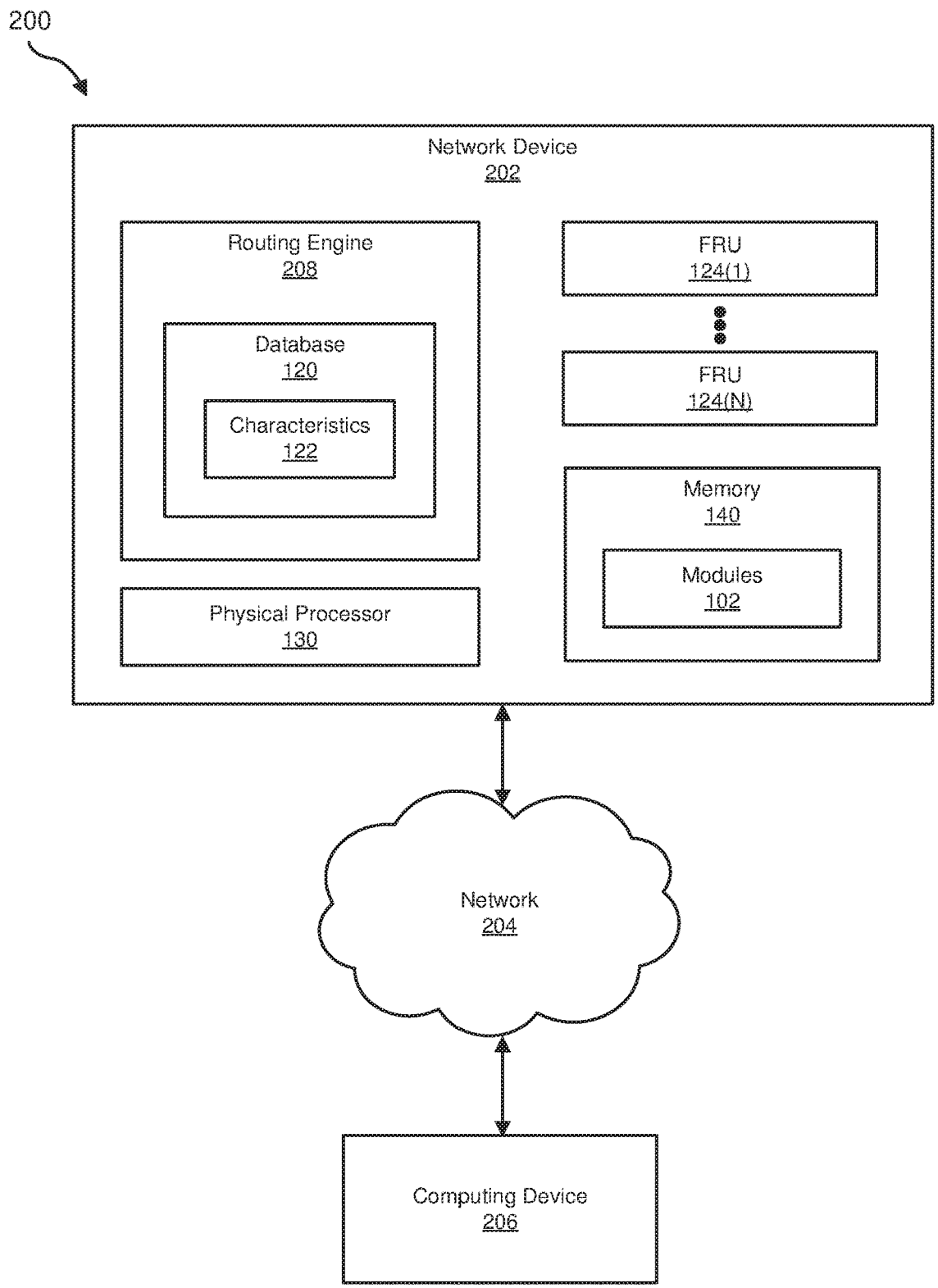
FIG. 2 is a block diagram of an exemplary implementation of an apparatus for correcting slow FRUs in network devices.
Figure 4:
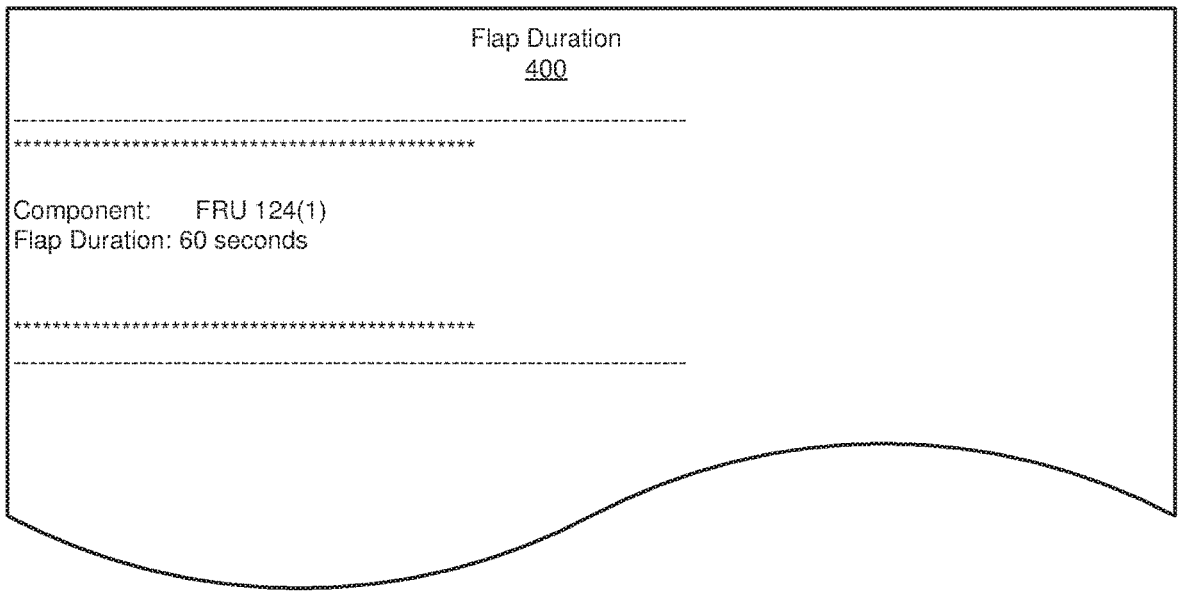
FIG. 4 is an illustration of exemplary information that identifies and/or represents a flap duration and a corresponding threshold.
Figure 4:
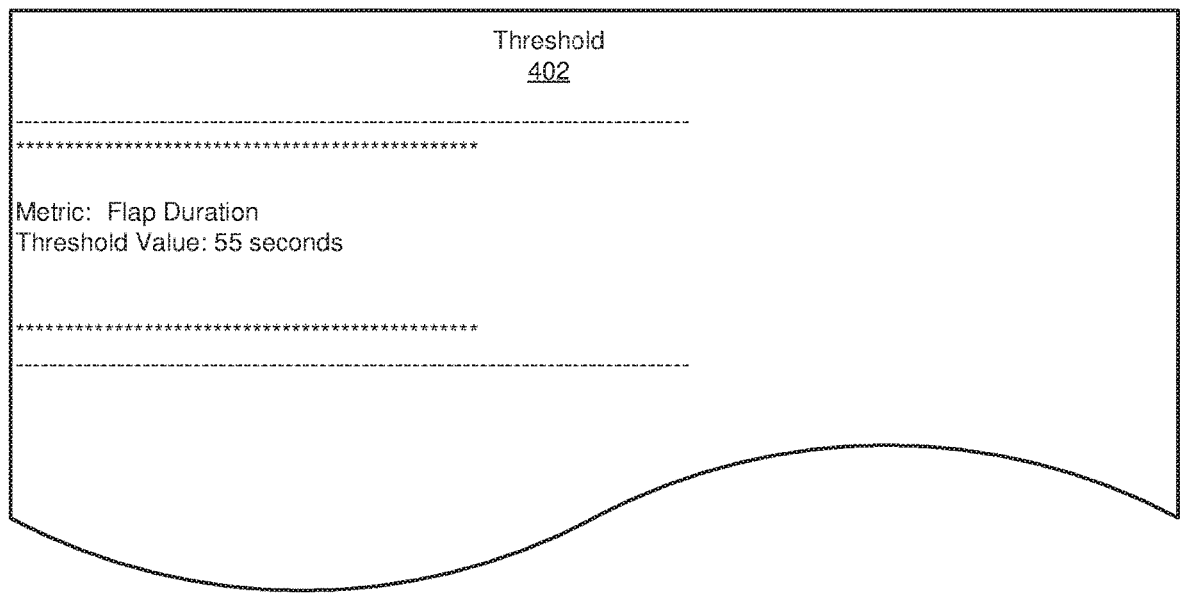
Figure 5:
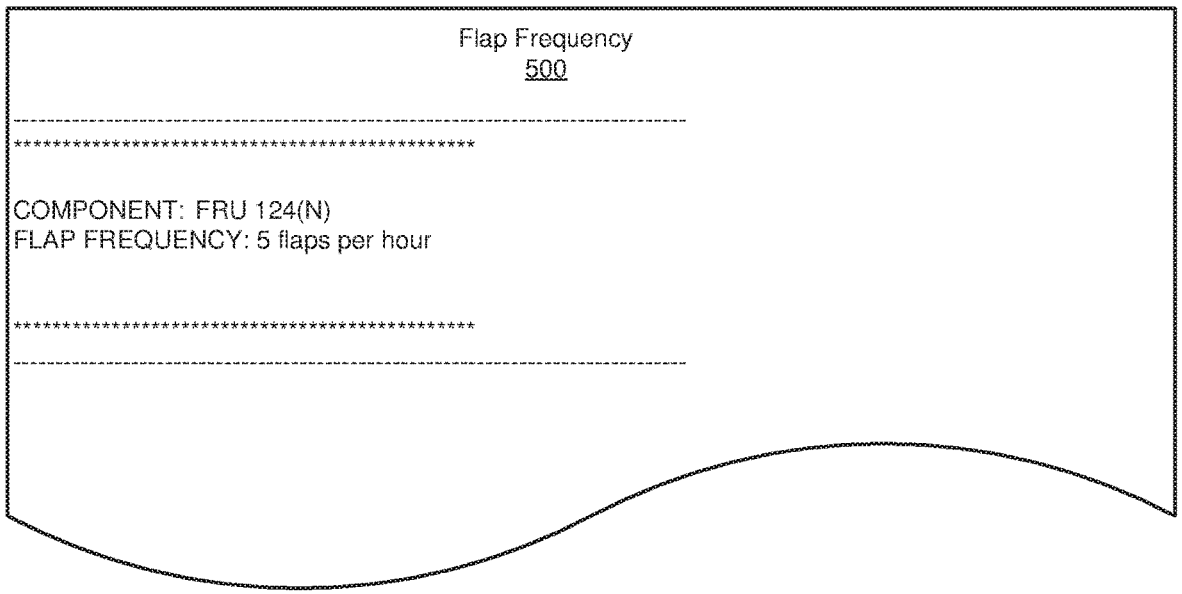
FIG. 5 is an illustration of exemplary information that identifies and/or represents a flap frequency and a corresponding threshold.
Figure 5:
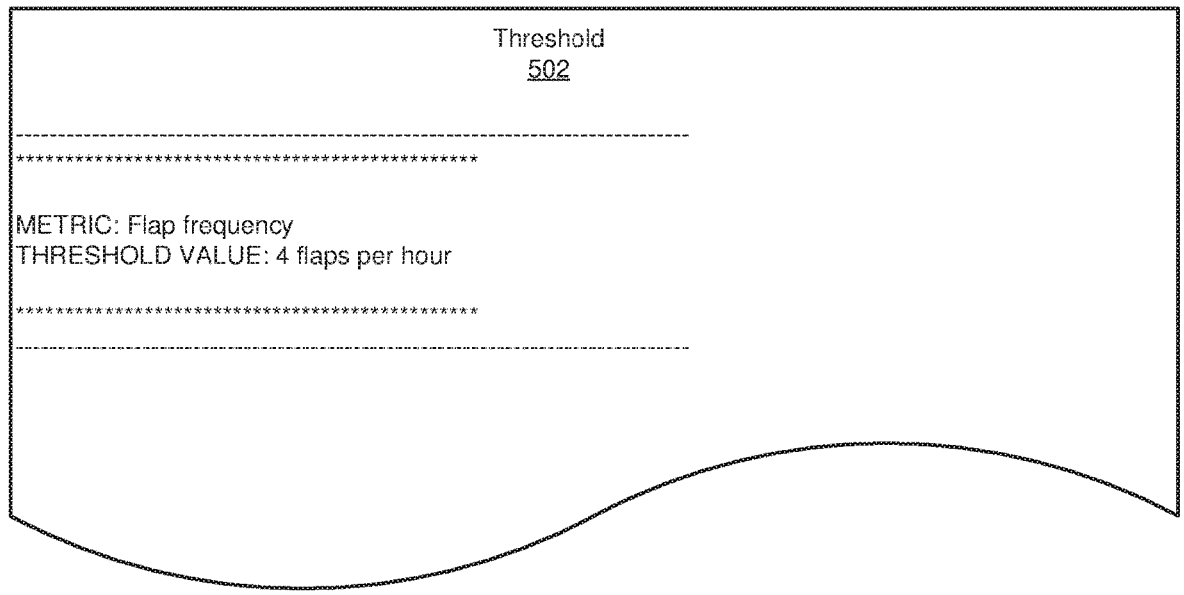
Figure 6:
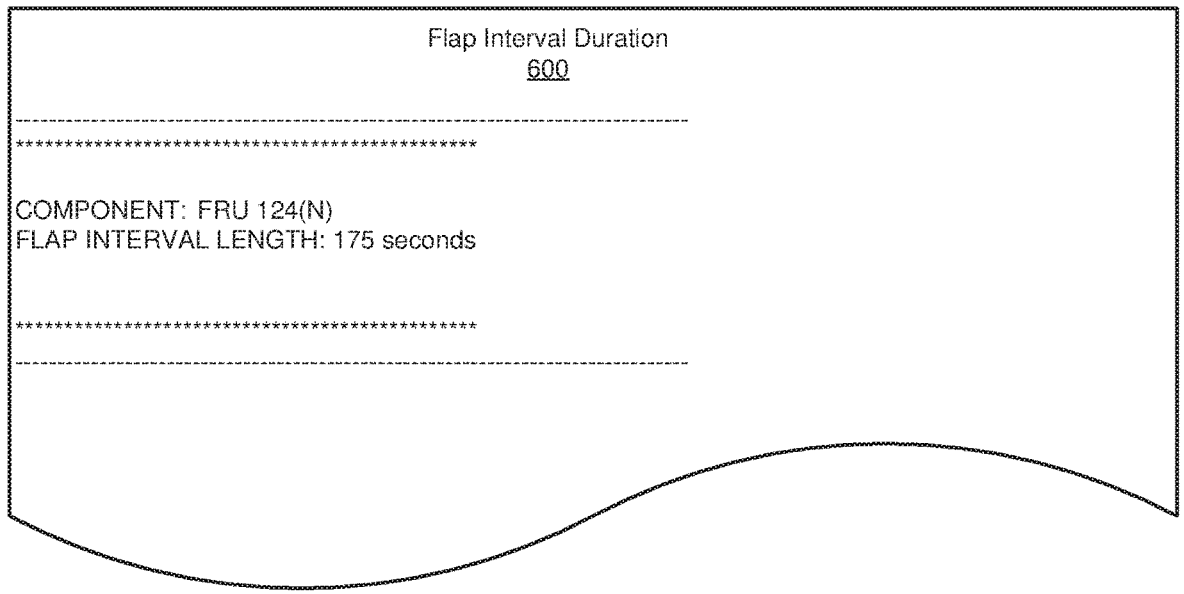
FIG. 6 is an illustration of exemplary information that identifies and/or represents a flap interval duration and a corresponding threshold.
Figure 6:
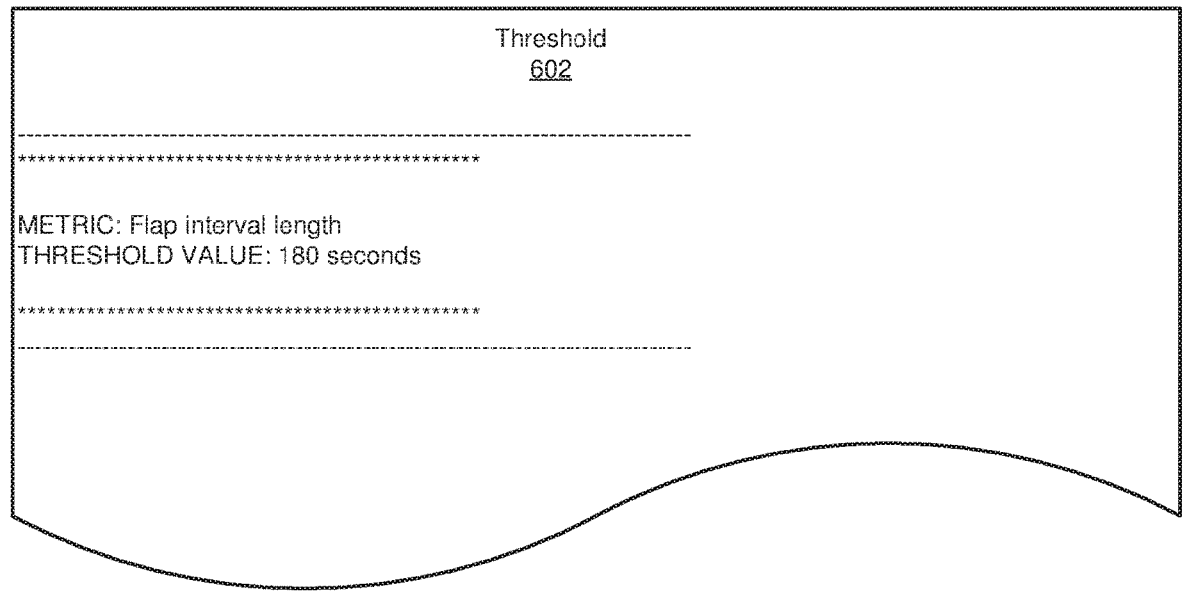

The following will provide, with reference to FIGS. 1 and 2, detailed descriptions of exemplary apparatuses, systems, and corresponding implementations for correcting slow FRUs in network devices. Detailed descriptions of corresponding computer-implemented methods will be provided in connection with FIG. 3. Detailed descriptions of exemplary thresholds, flap durations, flap frequencies, and flap interval duration will be provided in connection with FIGS. 4-6. In addition, detailed descriptions of an exemplary computing system for carrying out these methods will be provided in connection with FIG. 7.

FIG. 1 shows an exemplary system 100 that facilitates correcting slow FRUs in network devices. As illustrated in FIG. 1, system 100 may include one or more modules 102 for performing one or more tasks. As will be explained in greater detail below, modules 102 may include a monitoring module 104, a determination module 106, a correction module 108, and a database module 110. Although illustrated as separate elements, one or more of modules 102 in FIG. 1 may represent portions of a single module or application (such as an operating system, a software program, a packet filtering tool, and/or a network debug tool) running on a routing engine, an FRU, and/or any other suitable component within a network device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or computing device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to correct slow FRUs in network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more databases, such as a database 120. In some examples, database 120 may store and/or maintain characteristics 122. In these examples, characteristics 122 may correspond to and/or represent one or more FRUs installed in and/or running on a network device. Examples of characteristics 122 include without limitation, durations of flaps, frequencies of flapping experienced by FRUs, durations of intervals between flaps, bootup and/or reboot times, memory-saving times, memory-copying times, memory-restoring times, variations or combinations of one or more of the same, and/or any other suitable characteristics of FRUs.

As illustrated in FIG. 1, exemplary system 100 may additionally include one or more FRUs, such as FRUs 124(1)-(N). The term "field-replaceable unit" and its abbreviation "FRU," as used herein, generally refer to any type or form of modular device that includes one or more ports and/or interfaces that carry and/or forward traffic within a network and/or across multiple networks. In some examples, FRUs 124(1)-(N) may correspond to, represent, and/or be responsible for the data plane and/or forwarding plane of network device 202. Accordingly, FRUs 124(1)-(N) may represent all or a portion of the packet forwarding engine of network device 202. Examples of FRUs 124(1)-(N) include, without limitation, line cards, Physical Interface Cards (PICs), Flexible PIC Concentrators (FPCs), Switch Interface Boards (SIBs), control boards, routing engines, communication ports, fan trays, connector interface panels, portions of one or more of the same, combinations or variations of one or more of the same, and/or any other suitable FRUs.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with a computing device 206 via a network 204. In one example, all or a portion of the functionality of modules 102 may be performed by network device 202, computing device 206, and/or any other suitable computing system that is not explicitly illustrated in FIG. 2. For example, and as will be described in greater detail below, one or more of modules 102 from FIG. 1 may, when executed by at least one processor of network device 202 and/or computing device 206 in FIG. 2, enable network device 202 and/or computing device 206 to correct slow FRUs installed and/or running on network device 202.

For example, and as will be described in greater detail below, one or more of modules 102 may cause network device 202 to (1) identify a set of FRUs 124(1)-(N) installed on a network device, (2) monitor the set of FRUs 124(1)-(N) for flapping that renders any of the FRUs temporarily inoperable, (3) detect at least one flap in which an FRU within the set (A) experiences a fault that renders the FRU temporarily inoperable and (B) subsequently overcomes the fault to resume operability, (4) determine that the FRU is deficient based at least in part on at least one characteristic of the flap detected in connection with the FRU, and (5) perform at least one corrective action that addresses the deficiency of the FRU.

Network device 202 generally represent any type or form of physical computing device capable of reading computer-executable instructions and/or handling network traffic. In one example, network device 202 may include and/or represent a router (such as a provider edge router, hub router, spoke router, autonomous system boundary router, and/or area border router) that receives, routes, forwards, and/or otherwise handles network traffic. Additional examples of network device 202 include, without limitation, switches, hubs, modems, bridges, repeaters, gateways multiplexers, network adapters, network interfaces, laptops, tablets, desktops, servers, cellular phones, Personal Digital Assistants (PDAs), multimedia players, embedded systems wearable devices, gaming consoles, variations or combinations of one or more of the same, and/or any other suitable network devices. An apparatus for correcting slow FRUs may include and/or represent all or a portion of network device 202.

Network 204 generally represents any medium or architecture capable of facilitating communication or data transfer. In one example network 204 may facilitate communication between network device 202 and computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, network device 202 and computing device 206 may each represent a portion of network 204 and/or be included in network 204.

As illustrated in FIG. 2, network device 202 may include a routing engine 208 that includes and/or maintains database 120. In some examples, routing engine 208 may include and/or represent one or more physical devices and/or components tasked with routing network traffic among various paths within a network and/or across networks. In such examples, routing engine 208 may correspond to, represent, and/or be responsible for the control plane of network device 202.

Computing device 206 generally represents any type or form of computing device capable of reading computer-executable instructions. In one example, computing device 206 may include and/or represent a diagnostic device and/or server that monitors flaps occurring on network device 202, diagnoses the underlying problem causing such flaps, and/or corrects the underlying problem to improve the performance of network device 202. In another example, computing device 206 may include and/or represent a network device (such as a router and/or switch) that handles and/or forwards traffic within a network and/or across networks. Additional examples of computing device 206 include, without limitation, client devices, end-point devices, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Figure 3:
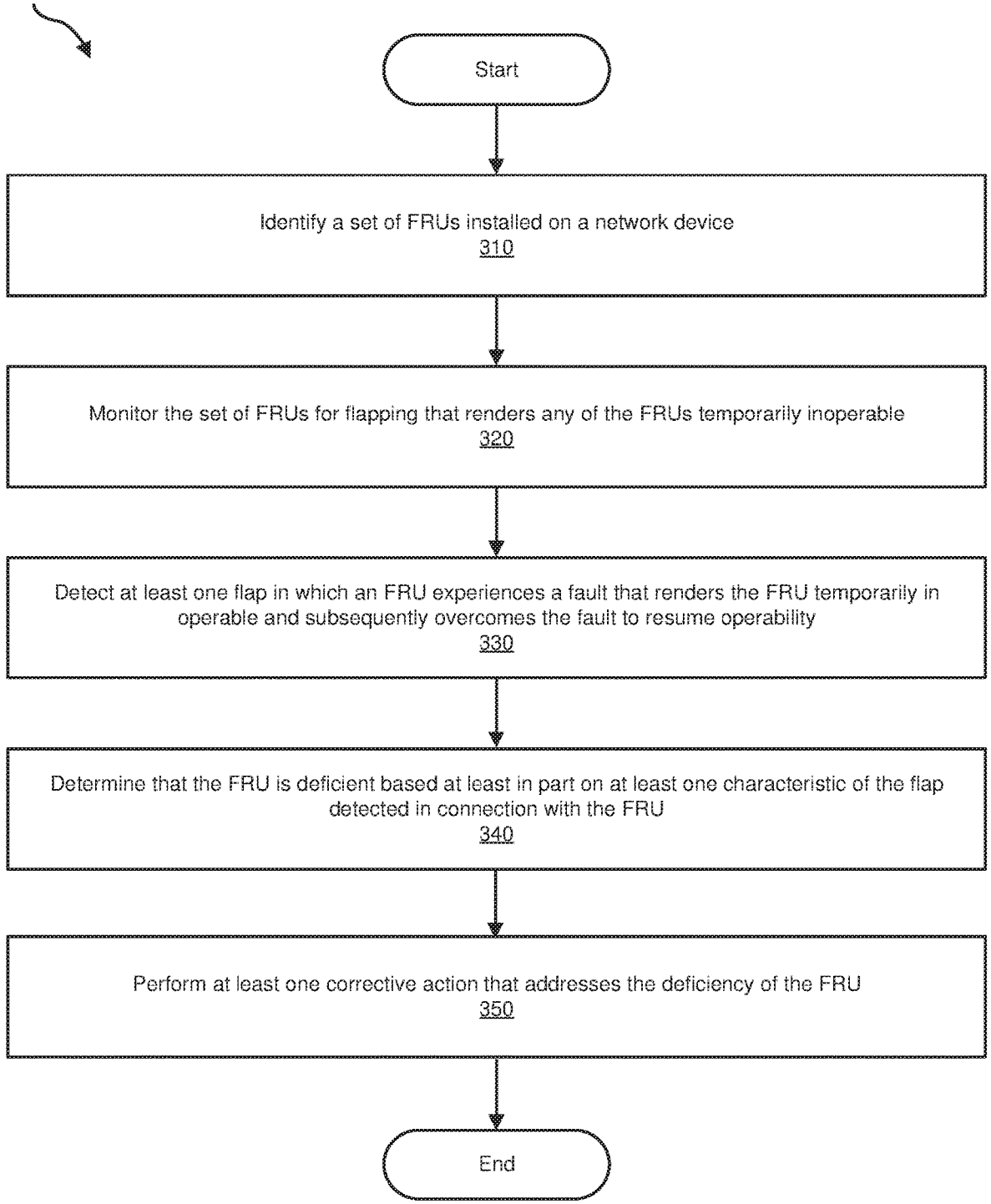
FIG. 3 is a flow diagram of an exemplary method for correcting slow FRUs in network devices.

FIG. 3 is a flow diagram of an exemplary computer-implemented method 300 for correcting slow FRUs in network devices. The steps shown in FIG. 3 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a set of FRUs installed on a network device. For example, monitoring module 104 may, as part of network device 202 and/or computing device 206 in FIG. 2, identify FRUs 124(1)-(N) installed and/or running on network device 202. In one example, FRUs 124(1)-(N) may include and/or represent a set of identical devices with the same make and model as each other. As a specific example, FRUs 124(1)-(N) may each include and/or represent the same type of line card or PIC. Additionally or alternatively FRUs 124(1)-(N) may each include and/or represent the same type of FPC.

The systems described herein may perform step 310 in a variety of ways and/or contexts. In some examples, monitoring module 104 may monitor and/or track network device 202 for any and/or all FRUs that are installed and/or begin running on network device 202. For example, a network administrator may install FRU 124(1) into network device 202. Upon installation, FRU 124(1) may attempt to register for operation with network device 202. As FRU 124(1) registers with network device 202, monitoring module 104 may detect the attempt by FRU 124(1) to register with network device 202. Monitoring module 104 may then identify FRU 124(1) as being installed and/or running on network device 202.

Returning to FIG. 3, at step 320 one or more of the systems described herein may monitor the set of FRUs for flapping that renders any of the FRUs temporarily inoperable. For example, monitoring module 104 may, as part of network device 202 and/or computing device 206 in FIG. 2, monitor FRUs 124(1)-(N) for flapping that renders any of FRUs 124(1)-(N) temporarily inoperable. The term "flapping" and the phrase "to flap," as used herein, generally refer to any process, sequence, and/or event in which an FRU installed on a network device goes temporarily offline and/or is rendered temporarily inoperable and later returns online and/or resumes operability.

In some examples, a fault may cause FRU 124(1) to flap. Examples of such a fault include, without limitation, hardware malfunctions, firmware malfunctions, software malfunctions, combinations or variations of one or more of the same, and/or any other type of fault that renders an FRU inoperable. In one example, a memory failure may constitute and/or represent a hardware malfunction that causes FRU 124(1) to flap. In another example, a CPU failure may constitute and/or represent a hardware malfunction that causes FRU 124(1) to flap. In a further example, an interface card failure may constitute and/or represent a hardware malfunction that causes FRU 124(1) to flap.

The systems described herein may perform step 320 in a variety of ways and/or contexts. In some examples, monitoring module 104 may monitor and/or track faults that take down any of FRUs 124(1)-(N), For example, monitoring module 104 may monitor and/or track errors and/or events in connection with FRUs 124(1)-(N). Additionally or alternatively, monitoring module 104 may monitor and/or track lapses in the operability of FRUs 124(1)-(N). In particular, monitoring module 104 may monitor and/or track the status of certain FRUs and/or links within network 204.

In some examples, monitoring module 104 may monitor and/or track traffic handled by and/or the traffic activity of network device 202. In one example, monitoring module 104 may identify a duration of time in which no traffic is handled by FRU 124(1). Monitoring module 104 may then determine that FRU 124(1) has gone offline due at least in part to FRU 124(1) not handling any traffic during that time.

In some examples, monitoring module 104 may monitor and/or track communications and/or signals (such as a heartbeat) from FRUs 124(1)-(N) to be able to detect flaps. In other examples, monitoring module 104 may query FRUs 124(1)-(N) for evidence of operability and/or inoperability to be able to detect flaps.

Returning to FIG. 3, at step 330 one or more of the systems described herein may detect at least one flap in which an FRU within the set (1) experiences a fault that renders the FRU temporarily inoperable and (2) subsequently overcomes the fault to resume operability. For example, monitoring module 104 may, as part of network device 202 and/or computing device 206 in FIG. 2, detect at least one flap in which FRU 124(1) and/or 124(N) experiences a fault that renders the FRU temporarily inoperable for a period of time. In this example, the FRU may subsequently overcome the fault to resume operability in one way or another after the period of time.

The systems described herein may perform step 330 in a variety of ways and/or contexts. In some examples, monitoring module 104 may detect such flaps by identifying offline times and/or online times of certain FRUs. For example, monitoring module 104 may detect that FRU 124(1) has gone offline at a first point in time. In this example, monitoring module 104 may also detect that FRU 124(1) has returned online at a subsequent point in time. Monitoring module 104 may then log those offline and online times of FRU 124(1) in connection with this flap as characteristics 122 stored in database 120.

As another example, monitoring module 104 may detect that FRU 124(N) has gone offline at a first point in time. In this example, monitoring module 104 may also detect that FRU 124(N) has returned online at a subsequent point in time. Monitoring module 104 may then log those offline and online times of FRU 124(N) in connection with this flap as characteristics 122 stored in database 120.

Returning to FIG. 3, at step 340 one or more of the systems described herein may determine that the FRU is deficient based at least in part on at least one characteristic of the flap detected in connection with the FRU. For example, determination module 106 may, as part of network device 202 and/or computing device 206 in FIG. 2, determine that FRU 124(1) is deficient based at least in part on at least one of characteristics 122 maintained in database 120. This deficiency may indicate and/or denote that FRU 124(1) is slow relative to other FRUs installed on network device 202.

In one example, characteristics 122 may indicate and/or identify the number of flaps experienced by FRUs 124(1)-(N) over a certain period of time. Additionally or alternatively, characteristics 122 may indicate and/or identify the frequency at which FRUs 124(1)-(N) flapped over a certain period of time. Characteristics 122 may also indicate and/or identify the durations of the flaps experienced by FRUs 124(1)-(N) (e.g., the length of time that the FRUs were offline before returning online). Characteristics 122 may further indicate and/or identify the durations of the intervals between consecutive flaps experienced by FRUs 124(1)-(N).

The systems described herein may perform step 340 in a variety of ways and/or contexts. In some examples, determination module 106 may identify the characteristic of the flap detected in connection with FRU 124(1). In such examples, determination module 106 may compare the characteristic of the flap against a threshold value that serves as a reference for deficiency and/or slowness and then determine that the characteristic of the flap exceeds the threshold value. In response, determination module 106 may classify FRU 124(1) as deficient and/or slow due at least in part to the characteristic of the flap exceeding and/or violating the threshold value.

In some examples, database module 110 may maintain database 120 in routing engine 208 of network device 202. In such examples, database module 110 may manage, modify, and/or control characteristics 122 of FRUs 124(1)-(N) in connection with the flaps experienced by FRUs 124(1)-(N). In one example, database module 110 may identify characteristics 122 when they occur and/or arise in connection with the flaps experienced by FRUs 124(1)-(N). In this example, database module 110 may derive the threshold value from characteristics 122 and then classify FRU 124(1) as deficient and/or slow due at least in part to the characteristic of the flap experienced by FRU 124(1).

In some examples, database module 110 may track the characteristics of FRUs 124(1)-(N) over a certain period of time to build up a set of historical data. In such examples, database module 110 may generate a baseline of acceptable and/or unacceptable characteristics of FRUs 124(1)-(N) in connection with the flaps. For example, database module 110 may track the offline times at which FRUs 124(1)-(N) went offline and online times at which FRUs 124(1)-(N) returned online. Database module 110 may populate database 120 with those offline and online times.

In one example, database module 110 may analyze those offline and online times to derive the threshold values for acceptable and/or unacceptable characteristics. For example, database module 110 may determine that 55 seconds or more is an unacceptable flap duration based at least in part on such an analysis. In another example, database module 110 may determine that 4 or more flaps per hour is an unacceptable flap frequency. In a further example, database module 110 may determine that 3 minutes or less is an unacceptable interval between consecutive flaps. Database module 110 may store any of those threshold values in database 120 along with characteristics 122.

In some examples, determination module 106 may determine that FRU 124(1) is deficient and/or slow based at least in part on certain rules and/or policies. For example, a rule and/or policy may define a deficient and/or slow FRU as one whose flap exceeds a certain duration of time. Additionally or alternatively, a rule and/or policy may define a deficient and/or slow FRU as one that flaps more frequently than a certain threshold. A further rule and/or policy may define a deficient and/or slow FRU as one whose consecutive flaps occur within a certain amount of time of one another.

As a specific example, determination module 106 may determine that FRU 124(1) is deficient and/or slow because a flap experienced by FRU 124(1) lasted longer than the threshold value of 55 seconds. For example, database module 110 may generate a threshold 402 in FIG. 4 as a reference for acceptable and/or unacceptable flap durations. In this example, threshold 402 may define unacceptable flap durations as being of 55 seconds or more. Thus, threshold 402 may also define acceptable flap durations as being of less than 55 seconds. In one example, determination module 106 may determine that a flap duration 400 in FIG. 4 exceeds threshold 402 because FRU 124(1) experienced a flap of 60 seconds.

As another example, determination module 106 may determine that FRU 124(1) is deficient and/or slow because FRU 124(1) flaps more than 4 times per hour. For example, database module 110 may generate a threshold 502 in FIG. 5 as a reference for acceptable and/or unacceptable flap frequencies. In this example, threshold 502 may define unacceptable flap frequencies as consisting of 4 or more flaps per hour. Thus, threshold 502 may also define acceptable flap frequencies as consisting of less than 4 flaps per hour. In one example, determination module 106 may determine that a flap frequency 500 in FIG. 5 exceeds threshold 502 because FRU 124(1) experienced 5 flaps per hour (or 5 flaps in a single hour).

As a further example, determination module 106 may determine that FRU 124(1) is deficient and/or slow because the interval between consecutive flaps experienced by FRU 124(1) lasted less than 3 minutes. For example, database module 110 may generate a threshold 602 in FIG. 6 as a reference for acceptable and/or unacceptable flap interval lengths and/or durations. In this example, threshold 602 may define unacceptable flap interval lengths as lasting less than 180 seconds. Thus, threshold 602 may also define acceptable flap interval lengths as lasting 180 seconds or more. In one example, determination module 106 may determine that a flap interval duration 600 in FIG. 6 violates threshold 602 because FRU 124(1) experienced an interval of just 175 seconds between consecutive flaps.

In some examples, determination module 106 may determine that FRU 124(1) is slow and/or deficient in the event that a single rule and/or policy is violated by FRU 124(1). In other examples, determination module 106 may determine that FRU 124(1) is slow and/or deficient only in the event that multiple rules and/or policies are violated by FRU 124(1). For example, determination module 106 may determine that FRU 124(1) is slow and/or deficient because FRU 124(1) is flapping more frequently than one threshold and at least one of its flaps lasted longer than another threshold.

Returning to FIG. 3, at step 350 one or more of the systems described herein may perform at least one corrective action that addresses the deficiency of the FRU. For example, corrective module 108 may, as part of network device 202 and/or computing device 206 in FIG. 2, perform at least one corrective action that addresses the deficiency of FRU 124(1). In this example, the corrective action may remedy the deficiency in one way or another, thereby increasing the performance of FRU 124(1) and/or network device 202. Examples of such corrective action include, without limitation, rebooting the FRU, reconfiguring the FRU, replacing the FRU with another FRU, shutting down the FRU, marking the FRU as deficient and/or slow, notifying an administrator that manages the network device, combinations or variations of one or more of the same, and/or any other suitable corrective action.

The systems described herein may perform step 350 in a variety of ways and/or contexts. In some examples, corrective module 108 may reboot FRU 124(1) to remedy the deficiency of FRU 124(1). In other examples, corrective module 108 may reconfigure FRU 124(1) by changing certain settings to remedy the deficiency of FRU 124(1). In additional examples, corrective module 108 may shut down and/or power off FRU 124(1) to reroute traffic away from FRU 124(1) within network device 202. In further examples, corrective module 108 may notify an administrator who manages network device 202 to replace FRU 124(1) with another FRU. The administrator may then remove FRU 124(1) from network device 202 and install another FRU in s place.

In some examples, the corrective action may be determined based at least in part on information and/or statistics collected from FRUs 124(1)-(N). For example, FRU 124(1) may run certain tests on its hardware (such as the CPU, memory, and/or interface card). In this example, FRU 124(1) may collect the results of those tests and then send the same to routing engine 208 for storage in database 120. Upon receiving those test results, routing engine 208 may store them in database 120. In the event that FRU 124(1) is found to deficient and/or slow, routing engine 208 may examine the information and/or statistics from those test results to identify and/or narrow down the underlying cause of the deficiency and/or slowness of FRU 124(1).

Routing engine 208 may then select and/or take corrective action that addresses the underlying cause of the deficiency and/or slowness. For example, in the event that the underlying cause is a CPU failure routing engine 208 may notify the administrator that the flap of FRU 124(1) was caused by the CPU. Additionally or alternatively, routing engine 208 may direct FRU 124(1) to perform some sort of corrective action that is specifically tailored to remedy the CPU failure.

As another example, in the event that the underlying cause is a memory failure, routing engine 208 may notify the administrator that the flap of FRU 124(1) was caused by the memory device. Additionally or alternatively, routing engine 208 may direct FRU 124(1) to perform some sort of corrective action that is specifically tailored to remedy the memory failure.

As a further example, in the event that the underlying cause is an interface card failure, routing engine 208 may notify the administrator that the flap of FRU 124(1) was caused by the interface card. Additionally or alternatively, routing engine 208 may direct FRU 124(1) to perform some sort of corrective action that is specifically tailored to remedy the interface card failure.

As explained above in connection with FIGS. 1-6, the various apparatuses, systems, and methods described herein may facilitate correcting slow FRUs in network devices. In some examples, these apparatuses, systems, and methods may be applied in situations where a routing engine fails to generate, produce, and/or churn state con ng of certain data and/or information for consumption of FRUs (such as line cards and/or FPCs). For example, in some situations, a network device may include a routing engine that produces state for consumption by various FRUs. In such situations, the routing engine may send the state to those FRUs and then monitor how fast and/or quickly the FRUs consume the state. By monitoring how fast and/or quickly the FRUs consume the state, the routing engine may be able to identify, detect, and/or determine which FRUs are deficient and/or slow.

However, in other situations, the routing engine may fail to generate, produce, and/or churn any state changes for one reason or another. In such situations, the routing engine may be unable to identify, detect, and/or determine which FRUs are deficient and/or slow without the implementation of the apparatuses, systems, and methods described herein. To enable the routing engine to still identify and/or detect slow FRUs during these lapses in state changes, these apparatuses, systems, and methods may direct the FRUs to monitor, track, and/or collect various information and/or statistics relative to their performance and/or speed, especially in connection with any flaps experienced by those FRUs.

Examples of such information and/or statistics include, without limitation, offline times, online times, flap durations, bootup and/or reboot times, flapping frequencies, memory and/or core dumps, dump-save times, dump-copy times, dump-restore times, combinations or variations of one or more of the same, and/or any other suitable information and/or statistics.

Continuing with this example, the routing engine may create certain rules and/or policies for acceptable and/or unacceptable flapping of the FRUs based at least in part on the information and/or statistics collected over a historically significant amount of time. In particular, the routing engine may be able to derive certain thresholds that serve as reference points for determining whether any FRUs are deficient and/or slow relative to one another. The routing engine may determine that an FRU is deficient and/or slow due at least in part to the FRU's flaps violating one or more rules, policies, and/or thresholds derived from the FRUs' historical information and/or statistics.

Figure 7:
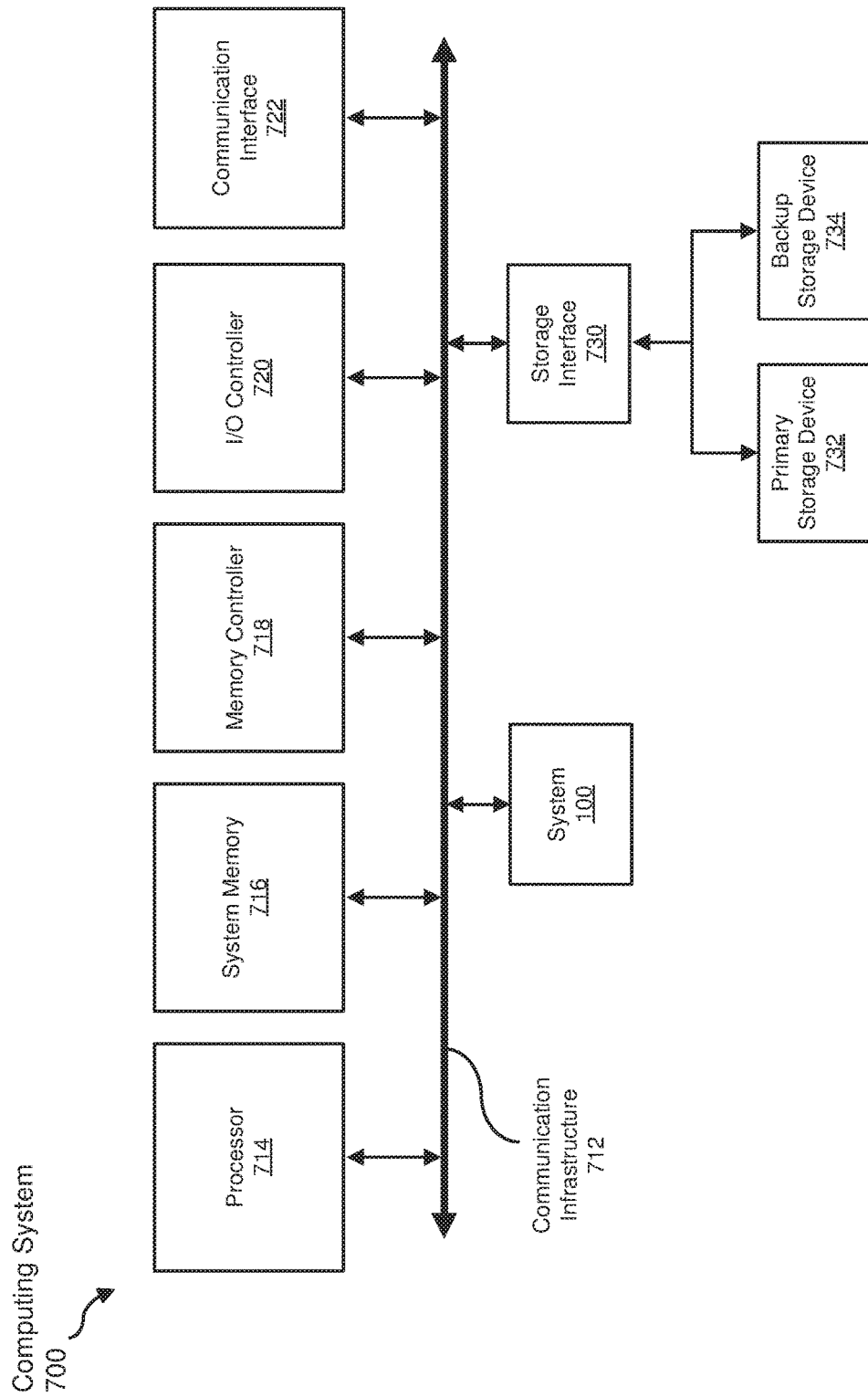
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a set of field-replaceable units installed on a network device;
   monitoring the set of field-replaceable units for flapping that renders any of the field-replaceable units temporarily inoperable;
   while monitoring the set of field-replaceable units, detecting one or more flaps in which a field-replaceable unit within the set:
      experiences a fault that renders the field-replaceable unit temporarily inoperable; and
      subsequently overcomes the fault to resume operability;
   determining that the field-replaceable unit is deficient based at least in part on a characteristic of the one or more flaps detected in connection with the field-replaceable unit; and
   performing at least one corrective action that addresses the deficiency of the field-replaceable unit.

2. The method of claim 1, wherein the corrective action comprises at least one of:
   rebooting the field-replaceable unit;
   reconfiguring the field-replaceable unit;
   replacing the field-replaceable unit with another field-replaceable unit;
   shutting down the field-replaceable unit; and
   notifying a network administrator that manages the network device.

3. The method of claim 1, wherein determining that the field-replaceable unit is deficient comprises:
   identifying the characteristic of the one or more flaps detected in connection with the field-replaceable unit;
   comparing the characteristic of the one or more flaps against a threshold value that serves as a reference for deficiency;
   determining that the characteristic of the one or more flaps exceeds the threshold value; and
   classifying the field-replaceable unit as deficient due at least in part to the characteristic of the one or more flaps exceeding the threshold value.

4. The method of claim 3, further comprising maintaining, in a routing engine of the network device, a database of characteristics of the set of field-replaceable units by:
   identifying the characteristics of the set of field-replaceable units;
   deriving the threshold value from the characteristics of the set of field-replaceable units; and
   storing the threshold value in the database.

5. The method of claim 4, wherein maintaining the database of characteristics of the set of field-replaceable units comprises:
   tracking the characteristics of the set of field-replaceable units over a period of time; and
   generating a baseline of acceptable characteristics of the set of field-replaceable units.

6. The method of claim 4, wherein the database of characteristics of the set of field-replaceable units comprises data entries that identify at least one of:
   a plurality of flaps experienced by the set of field-replaceable units;
   offline times at which the set of field-replaceable units went offline in connection with the plurality of flaps; and
   online times at which the set of field-replaceable units returned online in connection with the plurality of flaps.

7. The method of claim 1, wherein the characteristic of the one or more flaps comprises at least one of:
   a duration of the one or more flaps;
   a frequency of flapping experienced by the field-replaceable unit; and
   a duration of an interval between the one or more flaps.

8. The method of claim 1, wherein the fault that renders the field-replaceable unit temporarily inoperable comprises at least one of:
   a hardware malfunction;
   a firmware malfunction; and
   a software malfunction.

9. The method of claim 8, wherein the hardware malfunction that renders the field-replaceable unit temporarily inoperable comprises at least one of:
   a memory failure; and
   a central processing unit failure.

10. The method of claim 8, wherein:
    detecting the one or more flaps in which the field-replaceable unit comprises:
       identifying the fault as a hardware malfunction; and
       notifying a routing engine of the network device of the hardware malfunction that rendered the field-replaceable unit temporarily inoperable during the one or more flaps; and
    performing the corrective action comprises executing, by the routing engine of the network device, the corrective action in response to the notification of the hardware malfunction.

11. The method of claim 1, wherein the set of field-replaceable units comprise a plurality of identical field-replaceable units.

12. A system comprising:
    a monitoring module, stored in memory, that:
       identifies a set of field-replaceable units installed on a network device;
       monitors the set of field-replaceable units for flapping that renders any of the field-replaceable units temporarily inoperable;
       detects, while monitoring the set of field-replaceable units, one or more flaps in which a field-replaceable unit within the set:
          experiences a fault that renders the field-replaceable unit temporarily inoperable; and
          subsequently overcomes the fault to resume operability;

a determination module, stored in memory, determines that the field-replaceable unit is deficient based at least in part on a characteristic of the one or more flaps detected in connection with the field-replaceable unit;

a correction module, stored in memory, that performs at least one corrective action that addresses the deficiency of the field-replaceable unit; and at least one hardware processor configured to execute the monitoring module, the determination module, and the correction module.

13. The system of claim 12, wherein the corrective action comprises at least one of:

rebooting the field-replaceable unit;

reconfiguring the field-replaceable unit;

replacing the field-replaceable unit with another field-replaceable unit;

shutting down the field-replaceable unit; and notifying a network administrator that manages the network device.

14. The system of claim 12, wherein the determination module:

identifies the characteristic of the one or more flaps detected in connection with the field-replaceable unit;

compares the characteristic of the one or more flaps against a threshold value that serves as a reference for deficiency;

determines that the characteristic of the one or more flaps exceeds the threshold value; and classifies the field-replaceable unit as deficient due at least in part to the characteristic of the one or more flaps exceeding the threshold value.

15. The system of claim 14, further comprising a database module, stored in memory, that maintains, in a routing engine of the network device, a database of characteristics of the set of field-replaceable units by:

identifying the characteristics of the set of field-replaceable units;

deriving the threshold value from the characteristics of the set of field-replaceable units; and storing the threshold value in the database.

16. The system of claim 15, wherein the database module:

tracks the characteristics of the set of field-replaceable units over a period of time; and generates a baseline of acceptable characteristics of the set of field-replaceable units.

17. The system of claim 15, wherein the database of characteristics of the set of field-replaceable units comprises data entries that identify at least one of:

a plurality of flaps experienced by the set of field-replaceable units;

offline times at which the set of field-replaceable units went offline in connection with the plurality of flaps; and online times at which the set of field-replaceable units returned online in connection with the plurality of flaps.

18. The system of claim 12, wherein the characteristic of the one or more flaps comprises at least one of:

a duration of the one or more flaps;

a frequency of flapping experienced by the field-replaceable unit; and a duration of an interval between the one or more flaps.

19. The system of claim 12, wherein the fault that renders the field-replaceable unit temporarily inoperable comprises at least one of:

a hardware malfunction;

a firmware malfunction; and a software malfunction.

20. An apparatus comprising:

a physical storage device that maintains a database of characteristics of a set of field-replaceable units installed on a network device; and a physical processing device communicatively coupled to the physical storage device, wherein the physical storage device:

monitors the set of field-replaceable units for flapping that renders any of the field-replaceable units temporarily inoperable;

detects, while monitoring the set of field-replaceable units, one or more flaps in which a field-replaceable unit within the set:

experiences a fault that renders the field-replaceable unit temporarily inoperable; and subsequently overcomes the fault to resume operability;

determines that the field-replaceable unit is deficient by comparing a characteristic of the one or more flaps against the database of characteristics of the set of field-replaceable units; and performs at least one corrective action that addresses the deficiency of the field-replaceable unit.

* * * * *